United States Patent
Zi et al.

(10) Patent No.: US 8,442,190 B2
(45) Date of Patent: May 14, 2013

(54) METHOD, SYSTEM AND DEVICE FOR CALL PROCESSING

(75) Inventors: Xiaobing Zi, Shenzhen (CN); Fatai Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/219,199

(22) Filed: Aug. 26, 2011

(65) Prior Publication Data

US 2011/0311039 A1    Dec. 22, 2011

Related U.S. Application Data

(63) Continuation of application No. PCT/CN2010/070738, filed on Feb. 24, 2010.

(30) Foreign Application Priority Data

Feb. 27, 2009   (CN) .......................... 2009 1 0037565

(51) Int. Cl.
  *H04M 1/64*   (2006.01)
(52) U.S. Cl.
  USPC .................... 379/88.19; 379/88.21; 379/88.2; 379/88.22; 379/88.23
(58) Field of Classification Search ..... 379/8.19–88.278
  See application file for complete search history.

(56) References Cited

U.S. PATENT DOCUMENTS

| | | | |
|---|---|---|---|
| 6,970,543 B2 * | 11/2005 | Lautenschlager et al. | ......... 379/142.04 |
| 2004/0120478 A1 * | 6/2004 | Reynolds et al. | ......... 379/88.19 |
| 2007/0101018 A1 | 5/2007 | Shirazipour et al. | |
| 2010/0142685 A1 * | 6/2010 | Dolan et al. | ............ 379/88.21 |
| 2010/0226647 A1 | 9/2010 | Sun | |

FOREIGN PATENT DOCUMENTS

| | | |
|---|---|---|
| CN | 1501606 A | 6/2004 |
| CN | 101009626 A | 8/2007 |
| EP | 1598982 A1 | 11/2005 |
| WO | WO 2008/117968 A1 | 10/2008 |

OTHER PUBLICATIONS

Written Opinion of the International Searching Authority dated May 13, 2010 in connection with International Patent Application No. PCT/CN2010/070738.
International Search Report dated May 13, 2010 in connection with International Patent Application No. PCT/CN2010/070738.
Translation of Office Action dated Sep. 29, 2012 in connection with Chinese Patent Application No. 200910037565.6.

\* cited by examiner

*Primary Examiner* — Joseph J Nguyen

(57) ABSTRACT

A method, a system and a device for call processing are disclosed in the embodiments of the present invention. The method includes: obtaining, by a call initiator, address information of all or part of call managers in a network domain that processes a call, where the all or part of the call managers include a call manager that processes the call and is adjacent to the call initiator; sending, by the call initiator, a first call creating request message to an adjacent call manager according to the address information of the all or part of the call managers; and receiving, by the call initiator, a first call creating response message from the adjacent call manager. In the case that a service at a client side is required to be sent through multiple networks at a server side, inter-domain link selection and admission control may be implemented through section call processing.

6 Claims, 5 Drawing Sheets

METHOD, SYSTEM AND DEVICE FOR CALL PROCESSING

CROSS-REFERENCE TO RELATED APPLICATIONS

This application is a continuation of International Application No. PCT/CN2010/070738, filed on Feb. 24, 2010, which claims priority to Chinese Patent Application No. 200910037565.6, filed on Feb. 27, 2009, both of which are hereby incorporated by reference in their entireties.

TECHNICAL FIELD

The present invention relates to the field of communications, and in particular, to a method, a system and a device for call processing.

BACKGROUND

In a communication network, a user may be connected with equipment of the user through a connection service provided by an operator network, for example, the user may be connected with two routers through an optical connection service provided by an optical network operator. In the case that a control plane is introduced to a network, the control plane defines a general protocol, which may implement fast automatic creation of user services. The protocol includes two parts: a call and connection, where the call is used to implement functions such as authentication of a user access right and a switch of link information at a user side, and the connection is mainly used to provide the user services, that is, perform resource distribution and reservation in the operator network.

FIG. 1 is a schematic diagram of a call model in the prior art. As shown in FIG. 1, networks at two client side are accessed to a network at a server side through a User Network Interface (UNI) link, and the network at the server side sends a signal at the client side to another end. In nodes at the two ends of the UNI, a node in the network at the client side is called "UNI-C", and a node in the network at the server side is called "UNI-N".

Before creating a connection between UNI-Cs, a call is first created to implement route information interaction of the two ends and an admission control function of the network at the server side, and after the call is successfully created, the corresponding connection is created. A call initiated by equipment of the network at the client side may be processed by access equipment of the network at the server side, or may also be processed by a special unit, where the unit used for processing a call is called a Call Manager.

As shown in FIG. 1, before creating a connection between a UNI-C1 and a UNI-C2, the UNI-C1 initiates a call creating procedure, that is, sends a call creating request message to a UNI-N1, where the massage carries related information such as a requested bandwidth. The UNI-N1 determines whether to allow the call to be created according to a preconfigured policy, and if allowed, the UNI-N1 forwards the call creating request message to the UNI-N2, and then the UNI-N2 forwards the call creating request message to the UNI-C2. The UNI-C2 examines information such as a local UNI link bandwidth, and if the requirements are met, a call creating response message is returned to the UNI-N2, where, the message may carry information of local available UNI link, for designating an available link during connection creating. The UNI-N2 forwards the call creating response message to the UNI-N1, and then the UNI-N1 forwards the message to the UNI-C1, and finally, the call is successfully created. In the preceding procedure, the UNI-C1, UNI-N1, UNI-N2 and UNI-C2 all have a call processing function, that is, the function of a call manager is implemented.

After the call is successfully created, a connection creating procedure is initiated, For example, the UNI-C1 sends a connection creating request message to the UNI-N1 to designate a connection created onto the UNI-C2, and designate a remote link. The UNI-N1 calculates an appropriate route and creates the connection to the UNI-C2.

In the implementation of the present invention, the inventor finds that the call model in the prior art at least has the following problems. An existing General Multi-Protocol Label Switch (GMPLS) call model merely supports end-to-end call processing, in the case that a connection service passes through multiple networks at a server side (it is supposed that each network at the server side is divided into one domain), the existing call model does not support call section processing performed by each domain, therefore, functions such as inter-domain link selection and admission control of each domain are not supported.

SUMMARY

The technical problem that embodiments of the present invention need to solve is: to provide a method, a system and a device for call processing, so as to eliminate a defect that call section processing performed by each domain is not supported in the case that a service at a client side passes through multiple networks at a server side in the prior art.

In order to solve the preceding problem, an embodiment of the present invention provides a call processing method, where the method includes:

obtaining, by a call initiator, address information of all or part of call managers in a network domain that processes a call, where the all or part of the call managers include a call manager that processes the call and is adjacent to the call initiator;

sending, by the call initiator, a first call creating request message to an adjacent call manager according to address information of a first call manager in the address information of the all or part of the call managers; and receiving, by the call initiator, a first call creating response message from the adjacent call manager, where the first call creating response message is sent by the adjacent call manager in response to the first call creating request message.

Correspondingly, an embodiment of the present invention further provides a call processing method, where the method includes:

obtaining, by a call manager, address information of all or part of call managers between the call manager and a call receiving node in a network domain that processes a call, where the all or part of the call managers include a next call manager adjacent to the call manager;

sending, by the call manager, a third call creating request message to the next call manager according to address information of the next call manager in the address information of the all or part of the call managers, where the third call creating request message includes the address information of the all or part of the call managers; and receiving, by the call manager, a third call creating response message from the adjacent call manager, where the third call creating response message is sent by the adjacent call manager in response to the third call creating request message.

Correspondingly, an embodiment of the present invention further provides a call processing method, where the method includes:

receiving a call creating request message carrying service information and sent by a call initiating node;

obtaining address information of a call manager in a second network domain that processes the call according to the service information and preconfigured topology information;

sending the call creating request message carrying the service information to the call manager of the second network domain;

receiving a call creating response message from the call manager of the second network domain, where, the call creating response message includes available link information of a call receiving node and a call identifier (CallID) of the second network domain, and the CallID of the second network domain is determined on the basis of the service information;

replacing the CallID of the second network domain in the call creating response message with a CallID of a first network domain, where the CallID of the first network domain is determined on the basis of the service information, and the second network domain accesses an information stream of the first network domain; and sending the replaced call creating response message to the call initiating node.

Correspondingly, an embodiment of the present invention further provides a call processing method, where the method includes:

obtaining, by a call initiator, address information of all or part of call managers in a network domain that processes a call, where the all or part of the call managers include a first call manager that processes the call and is adjacent to the call initiator;

sending, by the call initiator, a first call creating request message to the first call manager according to address information of the first call manager in the address information of the all or part of the call managers, where the first call creating request message includes the address information of the all or part of the call managers;

receiving, by the first call manager, the first call creating request message, deleting the address information of the first call manager in the first call creating request message, and judging whether the call creating request message includes address information of a second call manager, where the second call manager is a call manager close to a call terminator and adjacent to the first call manager;

obtaining, by the first call manager, the address information of the second call manager, adding the address information of the second call manager to the call creating request message, and sending the call creating request message to the second call manager according to the obtained address information of the second call manager, when the call creating request message does not include the address information of the second call manager;

sending, by the second call manager, a call creating request message to a next call manager of the second call manager, receiving a call creating response message that is sent, according to the received call creating request message, by the next call manager from the next call manager of the second call manager, and sending the call creating response message to the first call manager; and sending, by the first call manager, the call creating response message to the call initiator.

Correspondingly, a node further provided in an embodiment of the present invention includes:

a first address obtaining unit, adapted to obtain address information of all or part of call managers in a network domain that processes a call, where the all or part of the call managers include a call manager that processes the call and is adjacent to a call initiator;

a first request unit, adapted to send a first call creating request message to an adjacent call manager according to address information of a first call manager in the address information of the all or part of the call managers; and a first response receiving unit, adapted to receive a first call creating response message from the adjacent call manager, where the first call creating response message is sent by the adjacent call manager in response to the first call creating request message.

Correspondingly, a call manager further provided in an embodiment of the present invention includes:

a second address obtaining unit, adapted to obtain address information of all or part of call managers between the call manager in a network domain that processes a call and a call receiving node, where the all or part of the call managers include a next call manager adjacent to the call manager;

a second request unit, adapted to send a third call creating request message to the next call manager according to address information of the next call manager in the address information of the all or part of the call managers, where the third call creating request message includes the address information of the all or part of the call managers; and a second response receiving unit, adapted to receive a third call creating response message from the adjacent call manager, where the third call creating response message is sent by the adjacent call manager in response to the third call creating request message.

Correspondingly, a call manager further provided in an embodiment of the present invention includes: a message transceiving unit and a processing unit, where:

the message transceiving unit, adapted to receive a call creating request message carrying service information and sent by a call initiator; and the processing unit, adapted to obtain address information of call managers of multiple network domains that process a call of the call initiator, and determine a call manager that processes the call according to the address information.

The message transceiving unit is further adapted to forward the call creating request message to the call manger determined by the processing unit, receive a call creating response message from the call manager, and send the call creating response message to the call initiator.

Correspondingly, a call processing system further provided in an embodiment of the present invention includes: a call initiating node, a call receiving node, and multiple call managers.

The call initiating node is adapted to send a call creating request message to request for creating a call from the call initiating node to the call receiving node.

The call manager is adapted to receive the call creating request message carrying service information and sent by the call initiating node, obtain address information of call managers of multiple network domains that process the call, determine an adjacent call manager that processes the call according to the address information, and send the call creating request message to the adjacent call manager; receive a call creating response message from the adjacent call manager, and send the call creating response message to the call initiating node; where the call creating response message is sent by the adjacent call manager according to the received call creating request message.

The embodiments of the present invention have the following beneficial effects.

In the case that a service at a client side needs to be sent through multiple networks at a server side, through a method, a system and a device for call processing provided by the embodiments of the present invention, link selection between each network domain and admission control between each network domain are implemented through section processing performed on a call initiated by a call initiator.

DETAILED DESCRIPTION

The technical solutions of embodiments of the present invention are clearly and completely described in the following with reference to the accompanying drawings in embodiments of the present invention. Obviously, the embodiments to be described are only a part rather than all of the embodiments of the present invention. Based on the embodiments of the present invention, all other embodiments obtained by persons skilled in the art without creative efforts shall fall within the protection scope of the present invention.

Figure 1:
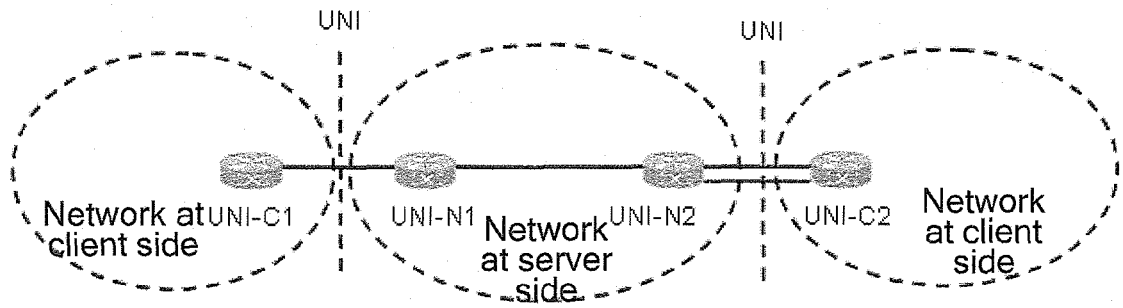
FIG. 1 is a schematic diagram of a call model provided in the prior art.
Figure 2:
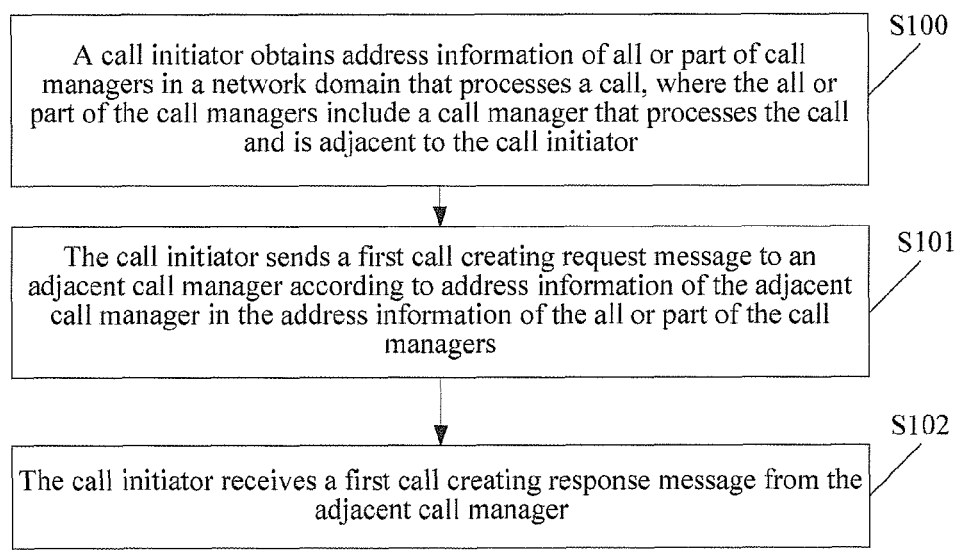
FIG. 2 is a flow chart of a call processing method according to a first embodiment of the present invention.

FIG. 2 is a flow chart of a call processing method according to a first embodiment of the present invention.

In the case that a service at a client side needs to be sent through multiple networks at a server side (it is supposed that each network at the server side is divided into one network domain), inter-domain link selection and admission control are implemented through section call processing. The call procedure includes the following steps.

S100: A call initiator obtains address information of all or part of call managers in a network domain that processes a call, where the all or part of the call managers include a call manager that processes the call and is adjacent to the call initiator.

S101: The call initiator sends a first call creating request message to an adjacent call manager according to address information of the adjacent call manager in the address information of the all or part of the call managers.

S102: The call initiator receives a first call creating response message from the adjacent call manager, where the first call creating response message is sent by the adjacent call manager in response to the first call creating request message.

The call initiator may be a node at the client side or a node at a network side. In the specific implementation, the address information includes addresses of the all or part of the call managers in multiple network domains that process the call, and the address information may be preconfigured, or may be obtained through calculation by the call initiator or a call manger in a first network domain according to call service information and preconfigured topology information.

The first call creating response message includes the address information of the all or part of the call managers, and the first call creating response message is sent by the adjacent call manager after the adjacent call manager sends a second call creating request message to a next call manager of the adjacent call manager and receives a second call creating response message from the next call manager. The second call creating response message is sent by the next call manager in response to the second call creating request message. The second call creating request message includes address information of the next call manager and also includes address information of other call managers, except that of the adjacent call manager and the next call manager, in the address information of the all or part of the call managers.

The adjacent call manager belongs to the first network domain, the next call manager belongs to a second network domain, and the second call creating response message includes available inter-domain link information of the first network domain and the second network domain. The first call creating response message includes available inter-domain link information of the network domains that process the call.

Through the call processing method provided in this embodiment of the present invention, in the case that the service at the client side needs to be sent through multiple networks at the server side, link selection between each network domain and admission control are further implemented through section processing performed on the call by multiple call managers.

Figure 3:
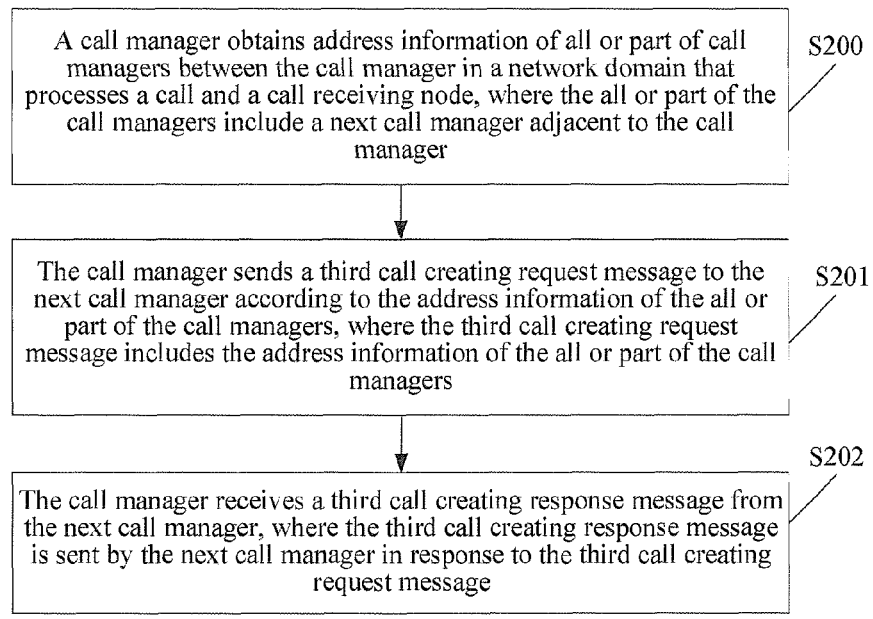
FIG. 3 is a flow chart of a call processing method according to a second embodiment of the present invention.

FIG. 3 is a flow chart of a call processing method according to a second embodiment of the present invention.

S200: A call manager obtains address information of all or part of call managers between the call manager in a network domain that processes a call and a call receiving node, where the all or part of the call managers include a next call manager adjacent to the call manager.

S201: The call manager sends a third call creating request message to the next call manager according to address information of the next call manager in the address information of the all or part of the call managers, where the third call creating request message includes the address information of the all or part of the call managers.

S202: The call manager receives a third call creating response message from the next call manager, where the third call creating response message is sent by the next call manager in response to the third call creating request message.

The third call creating response message is sent by the next call manager after the next call manager sends a fourth call creating request message to an adjacent call manager of the next call manager and being close to a call terminator and receives a fourth call creating response message from the adjacent call manager. The third call creating request message includes address information of the adjacent call manager, and also includes address information of other call managers, except that of the next call manager and the adjacent call manager, in the address information of the all or part of the call managers.

The next call manager belongs to a third network domain, the adjacent call manager belongs to a fourth network domain, and the fourth call creating response message includes available inter-domain link information of the third network domain and the fourth network domain.

Optionally, the call processing method of this embodiment of the present invention further includes: Before sending the third call creating request message to the next call manager, the call manager may further perform admission control according to call service information and locally configured policy information, and judges whether the call conforms to a local policy; and if yes, the call manager allows the call and executes a subsequent step of sending the third call creating request message to the next call manager according to the address information of the all or part of the call managers; otherwise, the call manager refuses the call and does not execute the subsequent step.

Through the call processing method provided in this embodiment of the present invention, in the case that the service at the client side needs to be sent through multiple networks at the server side, link selection between each network domain and admission control between each network domain are further implemented through section processing performed on the call by multiple call managers.

In another embodiment of the present invention, in the case that a service at a client side needs to be sent through multiple networks at a server side, link selection between each network domain is implemented through section processing performed on a call according to a call processing method in this embodiment, where the method specifically includes:

A call initiator obtains address information of all or part of call managers in a network domain that processes a call, where the all or part of the call managers include a first call manager that processes the call and is adjacent to the call initiator.

The call initiator sends a first call creating request message to the first call manager according to address information of the first call manager in the address information of the all or part of the call managers, where the first call creating request message includes the address information of the all or part of the call managers.

The first call manager receives the first call creating request message, deletes the address information of the first call manager in the first call creating request message, and judges whether the call creating request message includes address information of a second call manager, where the second call manager is a call manager close to a call terminator and adjacent to the first call manager.

When the call creating request message does not include the address information of the second call manager, the first call manager obtains the address information of the second call manager, adds the address information of the second call manager to the call creating request message, and sends the call creating request message to the second call manager according to the obtained address information of the second call manager.

The second call manager sends the call creating request message to a next call manager of the second call manager, receives from the next call manager of the second call manager a call creating response message that is sent, according to the received call creating request message, by the next call manager, and sends the call creating response message to the first call manager.

The first call manager sends the call creating response message to the call initiator.

When the call creating request message includes the address information of the second call manager, the first call manager sends the call creating request message to the second call manager according to the address information of the second call manager included in the call creating request message.

The obtaining the address information of the second call manager by the first call manager includes:

The first call manager receives address information of the second call manager designated by a network manager, or the call creating request message received by the first call manager includes call service information of the call initiator and preconfigured topology information.

The first call manger calculates address information of the second call manager according to the call service information of the call initiator and the preconfigured topology information.

The next call manager of the second call manger is a next call manager of the second call manager close to the call terminator, or the next call manager of the second call manger is the call terminator.

Through the call processing method provided in this embodiment of the present invention, in the case that the service at the client side needs to be sent through multiple networks at the server side, link selection between each network domain and admission control between each network domain are further implemented through section processing performed on the call by multiple call managers.

Figure 4:
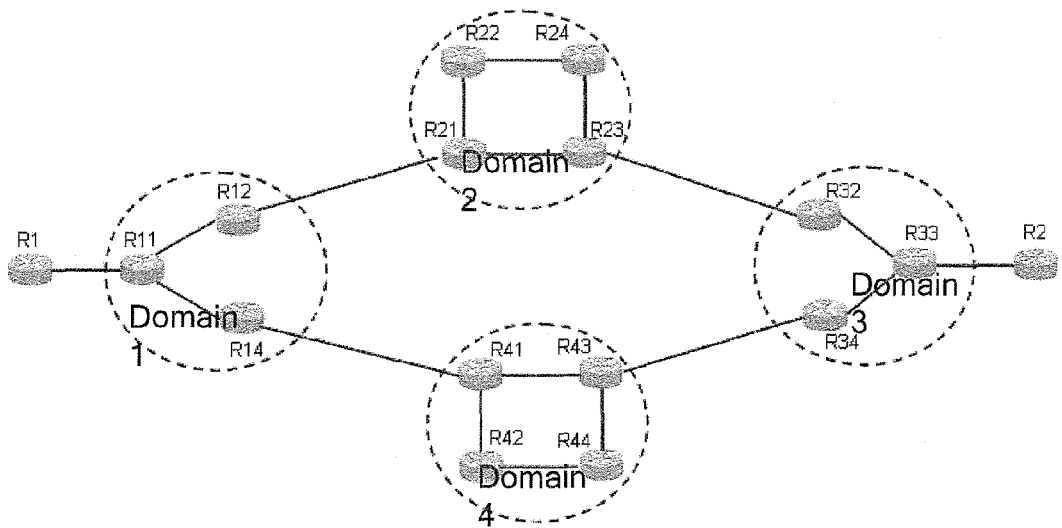
FIG. 4 is a schematic diagram showing a first scenario of a call processing method according to an embodiment of the present invention.

FIG. 4 is a schematic diagram showing a first scenario of a call processing method according to an embodiment of the present invention.

In this embodiment, take an example that a service at a client side needs to be sent through three networks at a server side (it is supposed that each network at the server side is divided into one network domain) for description. Topology information is configured in each network domain, such as node information, intra-domain topology information, interconnection information of each network domain, and a call manager is disposed in each network domain, which is adapted to process a call.

In this embodiment of the present invention, a source node R1 and a destination node R2 are equipment at the client side, and domains 1, 2, 3 and 4 jointly provide a connection service from the source node R1 to the destination node R2, where the domains 1 and 3 access equipment at the client side, and the domain 2 provide a sending service for the domain 1, that is, traffic accessed by the domain 1 may be sent to the domain 3. Specifically, the creating a call procedure from the source node R1 to the destination node R2 is as follows.

(1) The source node R1 sends a call creating request message to R11 to request for creating a call to the destination node R2, where, the call creating request message carries service information used to indicate the source node, the destination node and a required bandwidth of the call.

(2) The R11 receives the call creating request message, and performs admission control according to the service information in the call crating request message and locally configured policy information. The policy information includes maximum bandwidth information and domain route information. In the specific implementation, local policy information may be configured according to actual requirements, for example, the policy information may include: the maximum bandwidth information allowing access and sending from the R1 to the R2, and information indicating that the traffic accessed by the R1 may be sent to the R2 through the domains 2 and 3.

The R11 judges whether the call from the source node R1 to the destination node R2 conforms to the locally configured policy information, for example, judges whether the bandwidth requested by the call exceeds a locally configured maximum value, and if does not exceed, that is, the bandwidth conforms to the local policy, the R11 allows the call, and according to the service information of the call and preconfigured topology information, calculates to obtain address information of all call managers of multiple network domains that process the call, and determines a domain route from the source node R1 to the destination node R2; adds the address information to the call creating request message, and sends the call creating request message to a call manager of the next network domain that processes the call (it is supposed to be R21 of the domain 2), where the R21 and R32 are designated to process the call in the address information carried in the call creating request message. If the call does not conform to the locally configured policy, the call is refused, and the subsequent processing is not performed.

It should be noted that, in the specific implementation, address information of call managers of each network domain may also be preconfigured, and addresses of the call managers that processes the call are directly obtained according to the preconfigured address information during the call procedure.

(3) The R21 receives the call creating request message carrying the service information, performs admission control according to the service information and the locally configured policy information, and judges whether the call conforms to the local policy, and if conforms, the call is allowed, and the call creating request message is forwarded to a call manager of the next network domain (it is supposed to be the R32 of the domain 3) according to the address information in the call creating request message, where the R32 is designated to process the call in the address information carried in the call creating request message; if does not conform the local policy, the call is refused.

(4) The R32 receives the call creating request message carrying the service information, performs admission control according to the service information and the locally configured policy information, and judges whether the call conforms to the local policy, and if conforms, the call is allowed, and the call creating request message is forwarded to the call manager of the next network domain (R2) according to the address information in the call creating request message; if does not conform the local policy, the call is refused.

(5) The destination node R2 accepts the call, and returns a call creating response message to the R32. Optionally, before sending the call creating response message to the R32, available UNI link information of the R2 is added to the call creating response message according to information such as a local UNI link bandwidth of the R2.

(6) The R32 receives the call creating response message returned by the R2, and forwards the call creating response message to the R21. Optionally, before sending the call creating response message to the R21, available inter-domain link information between the domain 2 and the domain 3 is added to the call creating response message according to available link information between the domain 2 and the domain 3.

(7) The R21 receives the call creating response message returned by the R32, and forwards the call creating response message to the R11. Optionally, before sending the call creating response message to the R11, available inter-domain link information between the domain 1 and the domain 2 is added to the call creating response message according to available link information between the domain 1 and the domain 2.

(8) The R11 receives the call creating response message returned by the R21, and forwards the call creating response message to the R1.

(9) The source node R1 receives the call creating response message returned by the R11, and the call is successfully created.

In a call response procedure, if the nodes R2, R32 and R21 add link information in the call creating response message, the call creating response message received by the R1 includes the available UNI link information of the remote R2, the available inter-domain link information between the domain 2 and the domain 3, and the available inter-domain link information between the domain 1 and the domain 2.

In the preceding embodiment, the call manager R11 of the domain 1 designates the addresses of the call managers of all the network domains that process the call from the source node R1 to the destination node R2. In another embodiment of the present invention, the source node R1 initiating the call creating request message may also designate all (or part) of call managers required to process a call, which is described in the following with reference to a schematic diagram of a scenario shown in FIG. 3, and a specific processing procedure is as follows.

(1) R1 sends a call creating request message to R11 to request for creating a call to R2, and call managers R11 and R33 required to process the call are designated in the call creating request message, where, the call creating request message carries service information used to indicate a source node, a destination node and a required bandwidth of the call.

(2) The R11 performs admission control according to traffic information such as a bandwidth in the call creating request message and locally configured policy information (for example, the policy information includes: the maximum bandwidth allowing access and sending from the R1 to the R2, and traffic accessed by the R1 may be sent to the R2 through domains 2 and 3), judges whether the call conforms to a local policy, and if conforms, allows the call, and obtains address information of call managers that process the call according to the service information and configured topology information, designates call managers R12, R21, R23, R32 and R33 required to process the call in the call creating request message, and forwards the call creating request message to the next call manager R12; if does not conform the local policy, the call is refused.

(3) The R12 receives the call creating request message, forwards the call creating request message to the next call manager R21, and designates the call managers R21, R23, R32 and R33 required to process the call in the call creating request message.

(4) The R21 performs admission control according to the traffic information such as the bandwidth in the call creating request message and the locally configured policy information (for example, the policy information includes: the maximum bandwidth allowing access and sending from the R12 to a domain 3), and if conforms to the local policy, the call is passed, and the call creating request message is forwarded to the next call manager R23, and the call managers R23, R32 and R33 required to process the call is designated in the call creating request message; otherwise, the call is refused.

(5) The R23 receives the call creating request message, forwards the call creating request message to the next call manager R32, and designates the call managers R32 and R33 required to process the call in the call creating request message.

(6) The R32 performs admission control according to the traffic information such as the bandwidth in the call creating request message and the locally configured policy information (for example, the policy information includes: the maximum bandwidth allowing access and sending form the R23 to R2), and if conforms to a local domain policy, the call is passed, and the call manager R33 required to process the call is designated in the call creating request message, and the call creating request message is forwarded to a next call processing unit R33; otherwise, the call is refused.

(7) The R33 receives the call creating request message, and forwards the call creating request message to a call receiver R2.

(8) The call receiver R2 accepts the call, and returns a call creating response message to the R33. Optionally, before sending the call creating response message to the R33, available UNI link information may be added to the call creating response message according to information such as a UNI link bandwidth of the R2.

(9) The R33 receives the call creating response message returned by the R2, and forwards the call creating response message to the R32.

(10) The R32 receives the call creating response message returned by the R33, and forwards the call creating response message to the R23. Optionally, before sending the call creating response message to the R23, available inter-domain link information may be added to the call creating response message according to inter-domain link information between the domain 3 and the domain 2.

(11) The R23 sends the call creating response message to the R21.

(12) The R21 receives the call creating response message returned by the R23, and forwards the call creating response message to the R12. Optionally, before sending the call creating response message to the R12, available inter-domain link information may be added to the call creating response message according to inter-domain link information between the domain 2 and domain 1.

(13) The R12 receives the call creating response message returned by the R21, and sends the call creating response message to the R11.

(14) The R11 receives the call creating response message returned by the R12, and forwards the call creating response message to the R1.

(15) The R1 receives the call creating response message returned by the R11, and the call is successfully created.

In a call response procedure, if the nodes R2, R32 and R21 add link information in the call creating response message, the call creating response message received by the R1 includes the available UNI link information of the remote R2, the available inter-domain link information between the domain 2 and the domain 3, and the available inter-domain link information between the domain 1 and the domain 2.

In the preceding embodiment, in Step (1), the R1 may designate all call mangers required to process the call, that is, the R11, R12, R21, R23, R32 and R33 are designated to process the call in the call creating request message sent to the R11.

Furthermore, after the call is successfully created, a connection crating procedure is started, and the source node R1 initiates a connection creating process and sends a connection creating request message to the R11. If the related available UNI link information and the inter-domain link information are obtained through the call procedure, a UNI link and an inter-domain link may be designated in the connection creating request message. The connection procedure may be implemented through General MultiProtocol Label Switching Resource Reservation Setup Protocol with Traffic-engineering Extensions (GMPLS RSVP-TE), which is well known by persons skilled in the art, and is not described in detail here again.

Through the call processing method provided in this embodiment of the present invention, in the case that a connection from the source node to the destination node passes through multiple networks at the server side, section processing performed on the call by multiple network domains is implemented, so that link selection between each network domain and admission control are further implemented.

Figure 5:
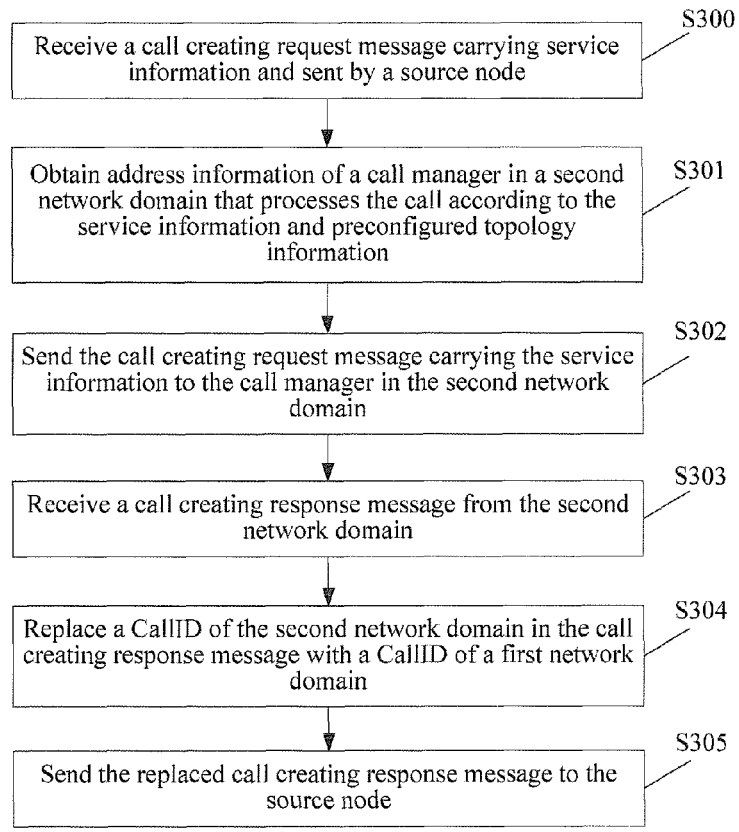
FIG. 5 is a flow chart of a call processing method according to a third embodiment of the present invention.

FIG. 5 is a flow chart of a call processing method according to a third embodiment of the present invention.

In this embodiment of the present invention, in the case that a service at a client side is sent through multiple networks at a server side (it is supposed that each network at the server side is divided into one network domain), section processing is performed on a call by each network domain, and the method includes the following steps.

S300: A call creating request message carrying service information and sent by a source node is received.

S301: Address information of a call manager in a second network domain that processes a call is obtained according to the service information and preconfigured topology information.

S302: The call creating request message carrying the service information is sent to the call manager of the second network domain.

S303: A call creating response message is received from the second network domain, where the call creating response message includes available link information of a destination node and a CallID of the second network domain.

S304: The CallID of the second network domain in the call creating response message is replaced with a CallID of a first network domain, where the CallID of the first network domain is determined on the basis of the service information.

S305: The replaced call creating response message is sent to the source node.

Specifically, after Step S300, the method further includes: determining an intra-domain link of the first network domain according to the service information and preconfigured intra-domain topology information.

After Step S301 of obtaining the address information of the call manager of the second network domain that processes the call, the method further includes: determining an inter-domain link of the first network domain and the second network domain according to the service information and preconfigured boundary link information. The call creating request message is sent to the call manager of the second network domain through the intra-domain link of the first network domain and the inter-domain link of the first network domain and the second network domain.

After Step S303 of receiving the call creating response message carrying the CallID of the second network domain from the second network domain, the method further includes: recording a corresponding relation between the CallID of the first network domain and the CallID of the second network domain. After Step S305 of indicating that the call is successfully created, the method further includes: receiving a connection creating request message sent by the source node, where the connection creating request message carries the service information and the CallID of the first network domain; replacing the CallID of the first network domain in the connection creating request message with the corresponding CallID of the second network domain according to the corresponding relation between the CallID of the first network domain and the CallID of the second network domain; sending the replaced connection creating request message to the second network domain through the intra-domain link of the first network domain, and the inter-domain link of the first network domain and the second network domain; and receiving a reservation message from the second network domain, and sending the reservation message to the source node.

Before the receiving the connection creating request message sent by the source node, the method further includes: recording a corresponding relation between the service information and the CallID of the first network domain. At this time, before replacing the CallID of the first network domain in the connection creating request message with the corresponding CallID of the second network domain according to the corresponding relation, the method further includes: judging whether service information corresponding to the CallID of the first network domain conforms to the service information carried in the connection creating request message, and if yes, replacing the CallID of the first network domain in the connection creating request message with the corresponding CallID of the second network domain according to the corresponding relation between the CallID of the first network domain and the CallID of the second network domain; otherwise, the subsequent step is not executed.

Optionally, after the receiving the call creating request message carrying the service information and sent by the source node, the method further includes: judging whether the service information carried in the call creating request message conforms to a preconfigured policy, and if yes, obtaining the address information of the call manager of the second network domain that processes the call according to the service information and the preconfigured topology information, and sending the call creating request message carrying the service information to the call manager of the second network domain; otherwise, the subsequent step is not executed.

Through this embodiment of the present invention, in the case that the call from the source node to the destination node passes through multiple networks at the server side, section processing performed on the call from the source node to the destination node by multiple network domains can be implemented, so that link selection between each network domain is further implemented.

Figure 6:
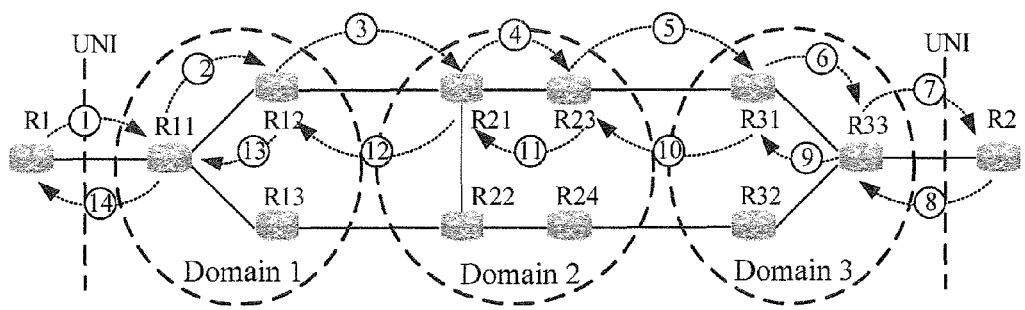
FIG. 6 is a schematic diagram showing a second scenario of a call processing method according to an embodiment of the present invention.

FIG. 6 is a schematic diagram showing a second scenario of a call processing method according to an embodiment of the present invention, taking an example that a service from a source node to a destination node passes through three network domains for description.

In this embodiment of the present invention, domains 1, 2 and 3 jointly provide a connection service from a source node R1 to a destination node R2, where the domains 1 and 3 access equipment at a client side, and the domain 2 provides a sending service for the domain 1, that is, traffic accessed in the domain 1 may be sent to the domain 3. In a call creating procedure, a policy identifier (for example, a contract number) may be carried in a call message, and a call manager of each domain performs admission control according to a policy corresponding to the policy identifier. Specifically, the domains 1, 2 and 3 mutually sign a contract, and the definition is as follows.

Contract 1(ID=1): the domain 2 is responsible for sending traffic of the maximum bandwidth X to the domain 3, and the domain 2 charges Y1 from the domain 1.

Contract 2 (ID=2): the domain 3 may receive the traffic of the maximum bandwidth X sent by the domain 2, the traffic flows to equipment at the client side of the domain 3, and the domain 2 charges Y2 from the domain 3.

Furthermore, equipment R1 and R2 at the client side respectively access the domains 1 and 3, and the equipment R1 and R2 at the client side belong to the same client, and respectively sign a contract with the domains 1 and 3 as follows.

Contract 3 (ID=3): the domain 1 is responsible for accessing traffic of the maximum bandwidth X of the equipment R1 at the client side, and charges Y3 from the client.

Contract 4 (ID=4): the domain 3 is responsible for sending the traffic of the maximum bandwidth X to the equipment R2 at the client side, and charges Y4 from the client.

In the specific implementation, information of the contract 3 is stored in the equipment R1 at the client side, information of the contract 4 is stored in the equipment R2 at the client side, the information of the contract 3 and the contract 1 is stored in a node R11 of the domain 1, the information of the contract 1 and the contract 2 is stored in nodes R21 and R22 of the domain 2, and the information of the contract 2 and the contract 4 is stored in nodes R31 and R32 of the domain 3.

Taking an example that a connection from the equipment R1 at the client side to the equipment R2 at the client side is created through three domains in the following, a method for implementing admission control by using a section call processing mode is described. A call creating procedure is as follows.

(1) The R1 sends a call creating request message (a Notify message defined in a GMPLS CALL) to the R11, where the preceding message carries service information (the source node=R1, the destination node=R2, and the bandwidth=X) and contract information (ID=3).

(2) The R11 receives the call creating request message, and processes the call, which includes: examining the pre-stored contract information and checking whether the service information carried in the call creating request message conforms to regulations of the contract according to the contract number in the message; and if yes, the call is allowed, a CallID (it is supposed that CallID=10) corresponding to the service information is distributed, and a corresponding relation between the CallID and the service information is stored. The R11 determines that the domain 2 is used to send the service to the R2 according to the service information, preconfigured topology information and boundary link information, finds that a link of R12-R21 meets bandwidth requirements, and then uses the R12 as an egress boundary node. Afterwards, the call creating request message is sent to the selected boundary node R12, where the call creating request message carries the service information, the CallID (CallID=10) and the contract number (ID=1).

(3) The R12 receives the call creating request message, stores the CallID (CallID=10) of the domain 1, removes the CallID from the message, and forwards the call creating request message to a boundary node R21 of a next network domain.

(4) The R21 receives the call creating request message, examines the pre-stored contract information (the contract with ID=1 needs to be sent to the domain 3), checks whether the service information carried in the call creating request message conforms to the regulations of the contract, and if yes, allows the call, distributes a CallID (it is supposed that CallID=20) corresponding to the service information, and stores a corresponding relation between the CallID and the service information. The R21 determines that the domain 3 is used to send the service to the R2 according to the service information, the preconfigured topology information and the boundary link information, finds that a link of R23-R31 meets the bandwidth requirements, and then uses the R23 as an egress boundary node. Afterwards, the call creating request message is sent to the selected egress boundary node R23, where the call creating request message carries the service information, the CallID (CallID=20) and the contract number (ID=2).

(5) The R23 receives the call creating request message, stores the CallID (CallID=20) of the domain 2, removes the CallID from the message, and forwards the call creating request message to a boundary node R31 of a next network domain.

(6) The R31 receives the call creating request message, examines the pre-stored contract information (the contract with ID=2 may receive the traffic with the maximum bandwidth X sent by the domain 2, the traffic flows to the equipment at the client side of the domain 3) signed with the domain 2 and the contract information (the contract with ID=4) signed with the client, checks whether the service information carried in the call creating request message conforms to the regulations of the contract, and if yes, allows the call, distributes a CallID (it is supposed that CallID=30) corresponding to the service information and stores a corresponding relation of the CallID and the service information. The R31 selects a route to the equipment R2 at the client side according to the service information and the preconfigured topology information, and uses the R33 as an egress boundary node. Afterwards, the call creating request message is sent to the selected egress boundary node R33, where the call creating request message carries the service information, the CallID (CallID=30) and the contract number (ID=4).

(7) The R33 receives the call creating request message, and forwards the call creating request message to the destination node R2.

(8) The R2 receives the call creating request message, examines the pre-stored contract information (the contract with ID=4), and checks whether the requested service information conforms to the regulations of the contract; and if conforms, the call is allowed, local link information is examined, an available link meeting service requirements is selected, and a call creating response message (the Notify message defined in the GMPLS CALL) carrying available link information of the destination node is constructed and sent to the R33.

(9) The R33 receives the call creating response message, and forwards the call creating response message to the R31.

(10) The R31 receives the call creating response message, examines links between the domain 3 and the domain 2, selects an available inter-domain link meeting the service requirements, adds the inter-domain available link information and the CallID (CallID=30) of the domain 3 to the call creating response message, and forwards the call creating response message to the R23.

(11) The R23 receives the call creating response message, stores the CallID (CallID=30) of the domain 3, records a corresponding relation between the CallID (CallID=30) and the CallID (CallID=20) of the domain 2, and forwards the call creating response message to the R21.

(12) The R21 receives the call creating response message, examines links between the domain 2 and the domain 1, selects an available inter-domain link meeting the service requirements, adds the inter-domain available link information to the call creating response message and replaces the CallID (CallID=30) in the message with the CallID (CallID=20) of the domain 2, and forwards the added and replaced call creating response message to the R12.

(13) The R12 receives the call creating response message, stores the CallID (CallID=20) of the domain 2, records a corresponding relation between the CallID (CallID=20) and the CallID (CallID=10) of the domain 1, and forwards the call creating response message to the R11.

(14) The R11 receives the call creating response message, replaces the CallID (CallID=20) in the call creating response message with the CallID (CallID=10) of the domain 1, and then forwards the call creating response message to the R1.

(15) The R1 receives the call creating response message, where the message includes the inter-domain available link information between each network domain and the CallID (CallID=10) of the domain 1, and the call is successfully created.

After the call is successfully created, a connection creating process is started, and a specific connection creating procedure is as follows.

(1) R1, according to the inter-domain available link information, determines a boundary node of each network domain that provides a connection service, constructs a Path message (a Path message in a RSVP) carrying the service information (the source node=R1, the destination node=R2 and the bandwidth=X), the CallID information (CallID=10) and boundary node information (R11, R21 and R31), and sends the Path message to the R11.

(2) The R11 receives the Path message, examines whether the service information in the message conforms to the service information corresponding to the CallID (CallID=10), and if conforms, calculates a route (R11-R12-R21) to a next boundary node R21, and sends the Path message to a next node R12 for requesting to create a connection.

(3) The R12 receives the Path message, where the R12 is an egress boundary node. The CallID (CallID=10) in the Path message is replaced with the CallID (CallID=20) according to the corresponding relation between the CallID (CallID=10) in the Path message and the CallID (CallID=20) of the domain 2, and the Path message is sent to an ingress boundary node R21 of the domain 2.

(4) The R21 receives the Path message, examines whether the service information in the message conforms to the service information corresponding to the CallID (CallID=20), and if conforms, calculates a route (R21-R23-R31) to a next boundary node R31, and sends the Path message to a next node R23 for requesting to create a connection.

(5) The R23 receives the Path message, where the R23 is the egress boundary node. The CallID (CallID=20) in the Path message is replaced with the CallID (CallID=30) according to the corresponding relation between the CallID (CallID=20) in the Path message and the CallID (CallID=30) of the domain 3, and the Path message is sent to an ingress boundary node R31 of the domain 3.

(6) The R31 receives the Path message, examines whether the service information in the message conforms to the service information corresponding to the CallID (CallID=30), and if conforms, calculates a route (R31-R33-R2) to the destination node R2, and sends the Path message to a next node R33 for requesting to create a connection.

(7) The R33 receives the Path message and directly forwards the Path message to the R2.

(8) The R2 receives the Path message, constructs and sends a reservation message (a Resv message in the RSVP) to the R33, where the Resv message carries the CallID (CallID=30).

(9) The R33 receives the Resv message and forwards the Resv message to the R31.

(10) The R31 receives the Resv message and forwards the Resv message to the R23.

(11) The R23 receives the Resv message, replaces the CallID (CallID=30) in the Resv message with the CallID (CallID=20) according to the corresponding relation between the CallID (CallID=30) in the Resv message and the CallID (CallID=20) of the domain 2, and sends the Resv message to the R21.

(12) The R21 receives the Resv message and forwards the Resv message to a previous node R12.

(13) The R12 receives the Resv message, replaces the CallID (CallID=20) in the Resv message with the CallID (CallID=10) according to the corresponding relation between the CallID (CallID=20) in the Resv message and the CallID (CallID=10) of the domain 1, and sends the Resv message to the R11.

(14) The R11 receives the Resv message and forwards the Resv message to the R1.

(15) The R1 receives the Resv message, and the connection is successfully created.

In the specific implementation, in the steps (2), (4) and (6) of the call creating procedure, an intra-domain link of a network domain, and an inter-domain link of the network domain and a downstream adjacent network domain may be respectively calculated (if the calculation of the intra-domain link fails, the call is refused), a mapping relation between the CallID of the network domain and the intra-domain link, and a mapping relation between the CallID of the network domain and the inter-domain link of the network domain and the downstream adjacent network domain are created and stored. Therefore, in the steps (2), (4) and (6) of the connection creating procedure, the corresponding intra-domain link and inter-domain link may be examined according to the CallID, and re-calculation of the intra-domain link and the inter-domain link is not required, thus ensuring that the intra-domain link and the inter-domain link both have resources and that the service is successfully created.

Through the call processing method provided in this embodiment of the present invention, in the case that the service from the source node to the destination node passes through multiple networks at a server side, section processing performed on the call from the source node to the destination node by multiple network domains can be implemented, so that link selection between each network domain and admission control between each network domain are further implemented.

In the preceding, the connection from the source node to the destination node passing through three network domains is merely an example for description, but the implementation of the present invention is not limited to this, and may also be applicable to a scenario where multiple network domains exist between a source node and a destination node.

The definition of the call message in the GMPLS Call in the prior art is as follows:

```
<Notify message> ::= <Common Header> [ <INTEGRITY> ]
    [[ <MESSAGE_ID_ACK> | <MESSAGE_ID_NACK>]...]
    [ <MESSAGE_ID> ]
    <ERROR_SPEC>
    <notify session list>
<notifysessionlist> ::= [<notifysessionlist>] <notify session>
<notify session> ::= <SESSION> [ <ADMIN_STATUS> ]
    [ < POLICY_DATA>...]
    [ <LINK_CAPABILITY> ]
    [ <SESSION_ATTRIBUTE> ]
    [ <sender descriptor> | <flow descriptor> ]
<sender descriptor> ::= <SENDER_TEMPLATE>
<SENDER_TSPEC>
<flow descriptor> ::= see [RFC3473]
```

The objects such as <LINK_CAPABILITY> and <POLICY_DATA> in the prior art cannot be processed in sections, and the <LINK_CAPABILITY> object is link information of a call destination node by default, and therefore, a designated node of the link information is not displayed in a response message. If inter-domain link information needs to be carried, a designated node of an inter-domain link and a designated node of a UNI link need to be displayed in a message.

In order to eliminate a defect that call section processing is not supported in the prior art, a first embodiment of the call processing method provided in this embodiment of the present invention and applied in a GMPLS Call message is as follows:

```
<Notify message> ::= <Common Header> [ <INTEGRITY> ]
    [[ <MESSAGE_ID_ACK> | <MESSAGE_ID_NACK>]...]
    [ <MESSAGE_ID> ]
    <ERROR_SPEC>
    <notify session list>
<notify session list> ::= [ <notify session list> ] <notify session>
<notify session> ::= <SESSION> [ <ADMIN_STATUS> ]
    [ <SESSION_ATTRIBUTE> ]
    [ <sender descriptor> | <flow descriptor> ]
    [ <call manager list> ]
< call manager list > ::= [ < call manager list > ] < call manager >
<callmanager> ::=<callmanageraddress>[<POLICY_DATA>...]
    [<node id> <LINK_CAPABILITY> ]
<sender descriptor> ::= see [RFC3473]
<flow descriptor> ::= see [RFC3473]
```

As for a format of a call creating request message and a call creating response message, reference may be made to the preceding embodiment, where, the <call manager list> object is added to implement functions of inter-domain link selection and admission control through section processing, that is, call content required to be processed by each call manager is designated, and addresses of the call managers are designated in <call manager address>. In the specific implementation, the objects such as <POLICY_DATA> may be designated to carry the content required to be processed according to the requirements, and the related contents required to be processed by other call managers may be designated in the <notify session> object.

In a response message, a <node id> object is added before <LINK_CAPABILITY>, which is used to indicate the node ID of the link information.

An executable solution of a call protocol extension method is described in the preceding, and other call protocol extension methods may also be adopted in this embodiment of the present invention. A second embodiment of the call processing method provided in this embodiment of the present invention and applied in the GMPLS Call message is as follows:

```
<Notify message> ::= <Common Header> [ <INTEGRITY> ]
    [[ <MESSAGE_ID_ACK> | <MESSAGE_ID NACK>]...]
    [ <MESSAGE_ID> ]
    <ERROR_SPEC>
    <notify session list>
<notify session list> ::= [ <notify session list> ] <notify session>
<notify session> ::= <SESSION> [ <ADMIN_STATUS> ]
    [<POLICY_DATA>... ] [<LINK_CAPABILITY> ]
    [ <SESSION_ATTRIBUTE> ]
    [<Call_ERO> ]
    [ <sender descriptor> | <flow descriptor> ]
<sender descriptor> ::= see [RFC3473]
<flow descriptor> ::= see [RFC3473]
```

In this embodiment, <Call_ERO> carries addresses of each call manager. <POLICY_DATA> is a unified policy of each network domain (for example, responsible for the sending of a service at the same client side), and the policy information is not required to be separately carried after the addresses of each call manager.

A third embodiment of the call processing method provided in this embodiment of the present invention and applied in the GMPLS Call message is as follows:

```
<Notify message> ::= <Common Header> [ <INTEGRITY> ]
      [[ <MESSAGE_ID_ACK> |
         <MESSAGE_ID_NACK>]...]
      [ <MESSAGE_ID> ]
      <ERROR_SPEC>
      <notify session list>
<notify session list> ::= [ <notify session list> ] <notify session>
<notify session> ::= <SESSION> [ <ADMIN_STATUS> ]
      [ <SESSION_ATTRIBUTE> ]
      [ <sender descriptor> | <flow descriptor> ]
      [ <call manager list> ]
< call manager list > ::= [ < call manager list > ] < call manager >
      <callmanager> ::=<callmanageraddress>[<POLICY_DATA>...]
         [<node id> <LINK_CAPABILITY> ]
      <sender descriptor> ::= see [RFC3473]
      <flow descriptor> ::= see [RFC3473]
```

The added <call manager list> object is used to implement the functions of the inter-domain link and the admission control through the section processing, and the content of the object is a reachable address of a call manager. A <node id> object is added before <LINK_CAPABILITY>, which is used to indicate a node of the link.

Figure 7:
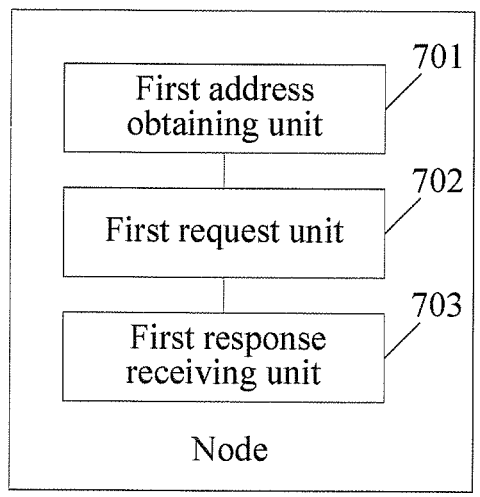
FIG. 7 is a schematic structural diagram of a node according to an embodiment of the present invention.

FIG. 7 is a schematic structural diagram of a node according to an embodiment of the present invention, and the node includes a first address obtaining unit 701, a first request unit 702, and a first response receiving unit 703.

The first address obtaining unit 701 is adapted to obtain address information of all or part of call managers in a network domain that processes a call, where the all or part of the call managers include a call manager that processes the call and is adjacent to a call initiator.

The first request unit 702 is adapted to send a first call creating request message to an adjacent call manager according to address information of the adjacent call manager in the address information of the all or part of the call managers.

The first response receiving unit 703 is adapted to receive a first call creating response message from the adjacent call manager, where the first call creating response message is sent by the adjacent call manager in response to the first call creating request message.

Figure 8:
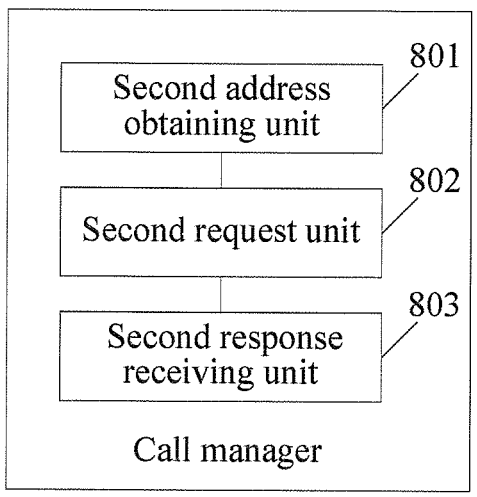
FIG. 8 is a schematic structural diagram of a call manager according to an embodiment of the present invention.

FIG. 8 is a schematic structural diagram of a call manager according to an embodiment of the present invention, and the call manager includes a second address obtaining unit 801, a second request unit 802, and a second response receiving unit 803.

The second address obtaining unit 801 is adapted to obtain address information of all or part of call managers between the call manager in a network domain that processes a call and a call receiving node, where the all or part of the call managers include a next call manager adjacent to the call manager.

The second request unit 802 is adapted to send a third call creating request message to the next call manager according to address information of the next call manager in the address information of the all or part of the call managers, where the third call creating request message includes the address information of the all or part of the call managers.

The second response receiving unit 803 is adapted to receive a third call creating response message from the next call manager, where the third call creating response message is sent by the next call manager in response to the third call creating request message.

Figure 9:
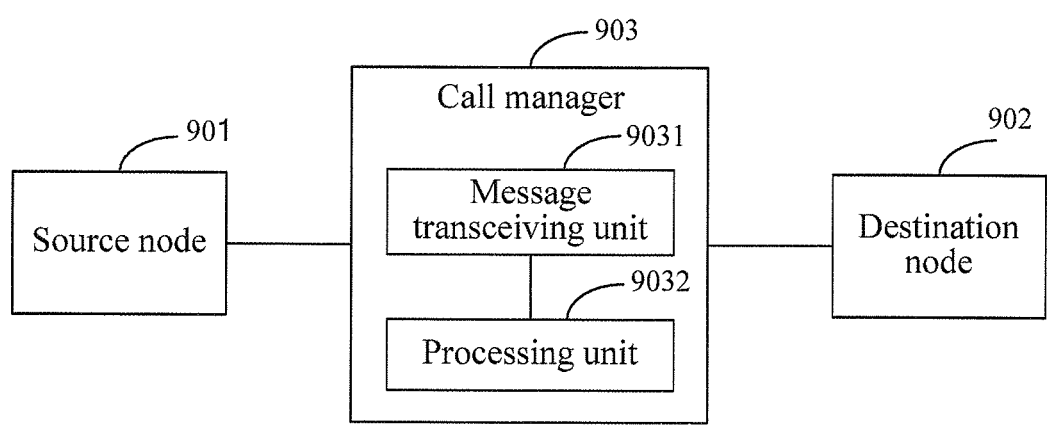
FIG. 9 is a schematic structural diagram of a call processing system according to an embodiment of the present invention.

FIG. 9 is a schematic structural diagram of a call processing system according to an embodiment of the present invention, and the system includes a source node 901, a destination node 902, and multiple call managers 903.

The source node 901 is adapted to send a call creating request message carrying service information to request for creating a call from the source node 901 to the destination node 903.

One of the call managers 903 is adapted to receive the call creating request message carrying the service information and sent by the source node 901, obtain address information of call managers of multiple network domains that process the call from the source node 901 to the destination node 903, determine a call manager that processes the call according to the address information, forward the call creating request message to the call manager, receive a call creating response message from the call manager, and send the call creating response message to the source node 901.

Specifically, the call manager 903 includes: a message transceiving unit 9031 and a processing unit 9032.

The message transceiving unit 9031 is adapted to receive the call creating request message carrying the service information and sent by the source node 901.

The processing unit 9032 is adapted to obtain the address information of the call managers of multiple network domains that process the call from the source node 901 to the destination node 903, and determine the call manager that processes the call according to the address information.

The message transceiving unit 9031 is further adapted to forward the call creating request message to the call manger determined by the processing unit 9032, receive a call creating response message from the call manager, and send the call creating response message to the source node 901.

In an embodiment of the call manager provided in the present invention, the processing unit of the call manager specifically includes: an inter-domain link determining module, an admission control module, an intra-domain link determining module, a CallID configuration module, and a replacing module.

The inter-domain link determining module is adapted to determine available inter-domain link information between a first network domain and a second network domain, and add the available inter-domain link information to a call creating response message.

The admission control module is adapted to judge whether the call conforms to a local policy according to call service information of a call initiator and locally configured policy information, and if yes, the call is allowed.

The intra-domain link determining module is adapted to determine intra-domain link of the first network domain according to the service information in the call creating request message and preconfigured intra-domain topology information.

The CallID configuration module is adapted to configure a CallID of the first network domain according to the service information carried in the call creating request message.

The replacing module is adapted to replace a CallID of the second network domain with the CallID of the first network domain in the call creating response message.

Through a method, a system and a device for call processing provided in the embodiments of the present invention, in the case that a service at a client side needs to be sent through multiple networks at a server side, link selection between each network domain and admission control between each network domain are implemented through section call processing.

Those of ordinary skill in the art may understand that all or part of the steps of the method according to the embodiments may be implemented by a program instructing relevant hardware. The program may be stored in a computer readable storage medium. When the program is run, the steps of the method according to the embodiments are performed. The storage medium may be a magnetic disk, an optical disk, a Read-Only Memory (ROM), and a Random Access Memory (RAM).

The preceding descriptions are exemplary embodiments of the present invention, and it should be noted that, any modification or improvement made without departing from the principle of the present invention by those of ordinary skill in the art should also fall within the protection scope of the present invention.

What is claimed is:

1. A call processing method, comprising:
    receiving a call creating request message carrying service information and sent by a call initiating node;
    obtaining address information of a call manager in a second network domain that processes the call according to the service information and preconfigured topology information;
    sending the call creating request message carrying the service information to the call manager of the second network domain;
    receiving a call creating response message from the call manager of the second network domain, wherein the call creating response message comprises available link information of a call receiving node and a call identifier (CallID) of the second network domain, and the CallID of the second network domain is determined on the basis of the service information;
    replacing the CallID of the second network domain in the call creating response message with a CallID of a first network domain, wherein the CallID of the first network domain is determined on the basis of the service information, and the second network domain accesses an information stream of the first network domain; and
    sending the replaced call creating response message to the call initiating node;
    wherein after the receiving the call creating response message from the call manager of the second network domain, the method further comprises: recording a corresponding relation between the CallID of the first network domain and the CallID of the second network domain; and
    after sending the replaced call creating response message to a call initiator, the method further comprises:
    receiving a connection creating request message sent by the call initiator, wherein the connection creating request message carries the service information and the CallID of the first network domain;
    replacing the CallID of the first network domain in the connection creating request message with the CallID of the second network domain according to the corresponding relation between the CallID of the first network domain and the CallID of the second network domain, and sending the replaced connection creating request message to the second network domain; and
    receiving a reservation message from the second network domain, and sending the reservation message to the call initiator.

2. The call processing method according to claim 1, wherein before the receiving the connection creating request message sent by the call initiator, the method further comprises:
    recording a corresponding relation between the service information and the CallID of the first network domain; and
    after receiving the connection creating request message sent by the call initiating node, the method further comprises:
    determining whether service information corresponding to the CallID of the first network domain in the connection creating request message conforms to the service information carried in the connection creating request message; if yes, replacing the CallID of the first network domain in the connection creating request message with the CallID of the second network domain according to the corresponding relation between the CallID of the first network domain and the CallID of the second network domain; and sending the replaced connection creating request message to the second network domain.

3. A call processing method, comprising:
    obtaining, by a call initiator, address information of all or part of call managers in network domains that process a call, wherein the all or part of the call managers comprise a first call manager that processes the call and is adjacent to the call initiator;
    sending, by the call initiator, a first call creating request message to the first call manager according to address information of the first call manager in the address information of the all or part of the call managers, wherein the first call creating request message comprises the address information of the all or part of the call managers;
    receiving, by the first call manager, the first call creating request message, deleting the address information of the first call manager in the first call creating request message, and judging whether the call creating request message comprises address information of a second call manager, wherein the second call manager is a call manager adjacent to the first call manager and close to a call terminator;
    obtaining, by the first call manager, the address information of the second call manager, adding the address information of the second call manager to the call creating request message, and, according to the obtained address information of the second call manager, sending the call creating request message to the second call manager, when the call creating request message does not comprise the address information of the second call manager;
    sending, by the second call manager, the call creating request message to a next call manager of the second call manager, receiving a call creating response message that is sent by the next call manager according to the received call creating request message from the next call manager of the second call manager, and sending the call creating response message to the first call manager; and
    sending, by the first call manager, the call creating response message to the call initiator.

4. The call processing method according to claim 3, further comprising:
    sending, by the first call manager, the call creating request message to the second call manager according to the address information of the second call manager comprised in the call creating request message, when the call creating request message comprises the address information of the second call manager.

5. The call processing method according to claim 3, wherein the obtaining, by the first call manager, the address information of the second call manager comprises:
- receiving, by the first call manager, address information of the second call manager designated by a network manager, or wherein the call creating request message received by the first call manager comprises call service information of the call initiator and preconfigured topology information; and
- calculating, by the first call manger, address information of the second call manager according to the call service information of the call initiator and the preconfigured topology information.

6. The call processing method according to claim 3, wherein the next call manager of the second call manger is a next call manager of the second call manager and being close to the call terminator, or the next call manager of the second call manger is the call terminator.

* * * * *